| (12) | United States Patent | (10) Patent No.: | US 9,871,250 B2 |
|---|---|---|---|
| | Kim et al. | (45) Date of Patent: | Jan. 16, 2018 |

(54) CATHODE ACTIVE MATERIAL FOR LITHIUM SECONDARY BATTERY, METHOD OF FABRICATING THE SAME, AND LITHIUM SECONDARY BATTERY INCLUDING THE SAME

(71) Applicant: SAMSUNG SDI CO., LTD., Yongin-si, Gyeonggi-do (KR)

(72) Inventors: Se Won Kim, Seoul (KR); Jong Seok Moon, Chungcheongnam-do (KR); Jae Ha Shim, Gyeonggi-do (KR); Tae Hwan Yu, Seoul (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 378 days.

(21) Appl. No.: 14/478,580

(22) Filed: Sep. 5, 2014

(65) Prior Publication Data

US 2015/0188135 A1    Jul. 2, 2015

(30) Foreign Application Priority Data

Dec. 30, 2013  (KR) ..................... 10-2013-0167340

(51) Int. Cl.

| H01M 4/00 | (2006.01) |
| H01M 4/505 | (2010.01) |
| H01M 4/36 | (2006.01) |
| H01M 4/525 | (2010.01) |
| H01M 4/58 | (2010.01) |
| H01M 10/052 | (2010.01) |
| H01M 4/02 | (2006.01) |

(52) U.S. Cl.

CPC ........... *H01M 4/505* (2013.01); *H01M 4/362* (2013.01); *H01M 4/525* (2013.01); *H01M 4/582* (2013.01); *H01M 10/052* (2013.01); *H01M 2004/021* (2013.01); *H01M 2004/028* (2013.01); *Y02T 10/7011* (2013.01)

(58) Field of Classification Search

CPC ...... H01M 4/362; H01M 4/505; H01M 4/525; H01M 10/052; H01M 4/582; H01M 2004/028; H01M 2004/021; Y02T 10/7011; Y02E 60/122

USPC ......................................................... 429/223

See application file for complete search history.

(56) References Cited

U.S. PATENT DOCUMENTS

| 2009/0142668 A1* | 6/2009 | Ishii ........................ | G11B 5/596 |
| | | | 429/231.8 |
| 2010/0062339 A1* | 3/2010 | Pan ........................ | H01M 4/131 |
| | | | 429/231.95 |
| 2010/0086854 A1 | 4/2010 | Kumar et al. | |
| 2011/0052981 A1 | 3/2011 | Lopez et al. | |
| 2013/0168599 A1 | 7/2013 | Kato et al. | |
| 2013/0266831 A1* | 10/2013 | Motohashi ............ | H01M 4/131 |
| | | | 429/61 |
| 2014/0162127 A1* | 6/2014 | Kim ........................ | H01M 4/366 |
| | | | 429/224 |

FOREIGN PATENT DOCUMENTS

| EP | 2736106 A2 | 5/2014 |
| KR | 10-20110076955 A | 7/2011 |

OTHER PUBLICATIONS

Extended European Search Report issued in corresponding European Application No. 14003038.8 dated May 4, 2015 (9 pages).
Jianming Zheng et al., Improved electrochemical performance of Li[Li0.2Mn0.54Ni0.13Co0.13]O2 cathode material by fluorine incorporation, Electrochimica Acta, vol. 105, May 10, 2013, pp. 200-208 (9 pages).

* cited by examiner

*Primary Examiner* — Gary Harris
(74) *Attorney, Agent, or Firm* — Lee & Morse, P.C.

(57) ABSTRACT

Provided are a cathode active material for a lithium secondary battery, a method of fabricating the same, and a lithium secondary battery including the same. The cathode active material includes a lithium composite transition metal oxide represented by $Li_{1+(c-a)/2}Ni_aCo_bMn_cO_{2-x}F_x$ ($0.1 \leq c-a \leq 0.4$, $0.13 \leq a \leq 0.3$, $0.03 \leq b \leq 0.2$, $0.4 \leq c \leq 0.6$, $(a+b+c)+(1+(c-a)/2)=2$, $0 < x \leq 0.15$, $1 \leq a/b \leq 6$, $1.9 \leq c/a \leq 4.0$, and $0.04 \leq b/(a+b+c) \leq 0.25$), and layer-structured $Li_2MnO_3$. Since the lithium secondary battery including the cathode active material has a large capacity and generates less gas, lifespan characteristics and high rate capability are significantly improved, and especially voltage variation during charging and discharging operations is small.

8 Claims, No Drawings

CATHODE ACTIVE MATERIAL FOR LITHIUM SECONDARY BATTERY, METHOD OF FABRICATING THE SAME, AND LITHIUM SECONDARY BATTERY INCLUDING THE SAME

CROSS-REFERENCE TO RELATED APPLICATION

This application claims priority to and the benefit of Korean Patent Application No. 10-2013-0167340, filed on Dec. 30, 2013, the disclosure of which is incorporated herein by reference in its entirety.

BACKGROUND

1. Field of the Invention

The present invention relates to a cathode active material for a lithium secondary battery, a method of fabricating the same, and a lithium secondary battery including the same. More specifically, the present invention relates to a cathode active material for a lithium secondary battery, in which a voltage drop of the lithium secondary battery may be reduced by optimizing a composition ratio of lithium to transition metals in a layer-structured fluorine-doped excess-lithium rich-manganese lithium composite transition metal oxide, a method of fabricating the same, and a lithium secondary battery including the same.

2. Discussion of Related Art

As information technology (IT) is gradually developed, capacity and lifespan of a lithium ion secondary battery are also being improved, which is a development of a cell design based on an existing material, $LiCoO_2$. However, a high capacity battery, which has been developed based on the cell design, has reached a capacity limit for use in recent smart apparatuses, electric vehicles, and the like. Accordingly, a need for a new material to be used in the lithium secondary battery is being raised. Recently, studies on layer-structured lithium composite transition metal oxides including excess lithium are being actively conducted since the capacity of a lithium secondary battery largely depends on a cathode active material.

As the cathode active material, lithium-containing cobalt oxide ($LiCoO_2$) is mainly being used, and other lithium-containing manganese oxide, such as layered crystal structured $LiMnO_2$ and spinel crystal structured $LiMn_2O_4$, and lithium-containing nickel oxide ($LiNiO_2$) are being considered to be used.

Among the above-described cathode active materials, $LiCoO_2$ is most commonly used as the cathode active material due to excellent lifespan characteristics and excellent charge and discharge efficiency. However, since $LiCoO_2$ has poor structural stability and poor price competitiveness due to limits in resource of cobalt used as a raw material, there is a limit to use $LiCoO_2$ as a power source in a field such as electric vehicles in large quantities.

$LiNiO_2$-based cathode active materials have relatively low prices and high discharge capacities, but have problems in that a rapid phase transition in a crystal structure may occur according to a volume change accompanying charging and discharging cycles, and stability may be sharply lowered when the $LiNiO_2$-based cathode active materials are exposed to air and moisture.

In addition, a lithium-containing manganese oxide such as $LiMnO_2$ has excellent thermal stability and a relatively low price, but has problems, such as small capacity, poor cycle characteristics, and poor high temperature characteristics.

In the case of a spinel-based lithium manganese oxide among the lithium manganese oxides, a relatively flat electrical potential may show in a 4 V zone (3.7 V to 4.3 V) and a 3 V zone (2.7 V to 3.1V) and a large amount of theoretical capacity of about 260 mAh/g or more may be obtained when both two zones are used (The theoretical capacity is about 130 mAh/g in both 3V and 4V zones). However, since cycle and storage characteristics are significantly dropped in the 3V zone, utilization of the spinel-based lithium manganese oxide may be difficult. In addition, when the spinel-based lithium manganese oxide is used alone as the cathode active material, only a half of available capacity may be used since there is no lithium source available for charging and discharging operations in the 3V zone under the present lithium secondary battery system in which the lithium source depends on the cathode active material. Further, since the spinel-based lithium manganese oxide undergoes a rapid voltage drop between the 4V and 3V zones and thereby shows a discrete voltage profile, a problem such as an insufficient output may occur in the 4V and 3V zone. Accordingly, it is practically difficult to use the spinel-based lithium manganese oxide as a power source of a middle- or large-sized device in the field of electric vehicles or the like.

A layer-structured lithium manganese oxide has been proposed in order to overcome the above-described shortcomings of the spinel-based lithium manganese oxide and ensure excellent thermal stability of manganese-based active materials.

In particular, a layer-structured $xLi_2MnO_3 \cdot (1-x)LiMO_2$ (0<x<1 and M=Co, Ni, Mn, etc.) in which a content of manganese (Mn) is greater than other transition metal(s), has a very large capacity when it is overcharged at a high voltage. However, there is a problem in that initial irreversible capacity is large.

In the layer-structured lithium composite transition metal oxide in which an equivalence ratio of lithium to composite transition metals (at least two selected from the group consisting of Ni, Mn, and Co) is one, each element may form $LiMO_2$ (M: at least two transition metals having oxidation numbers of +3 and +4) in a regular structure. However, a lithium composite transition metal oxide having an equivalence ratio of lithium to composite transition metals greater than one may form a repetitive crystal structure of a lithium layer, an oxygen layer, a transition metal layer, an oxygen layer, and a lithium layer. $Li_2M'O_3$ (M': a transition metal having oxidation numbers of +4 such as Mn and Ti) may be formed in such a manner that lithium occupies some sites of the transition metal layer. Since $Li_2M'O_3$ has a higher Li content than $LiMO_2$, high capacity may be implemented. However, $Li_2M'O_3$ may need to be charged and discharged at a voltage of 4.4 V or more since it is not activated at a voltage of less than 4.4 V. When $Li_2M'O_3$ is charged and discharged at a voltage of 4.4 V or more, voltage drop problems may continue to occur in the lithium secondary battery since at least 50% Li is desorbed from $LiMO_2$ and, at the same time, the transition metal is eluted.

Accordingly, needs for a lithium secondary battery having a high capacity and no rapid voltage drop zone, that is, having improved stability by showing an even profile across an entire state of charge (SOC) zone are increasing for use in the power of the middle- or large-sized devices.

PRIOR ART LITERATURE

Patent Literature (Patent Literature 1) Korean Patent Publication No. 10-2011-0076955

SUMMARY OF THE INVENTION

The present invention is directed to a cathode active material for a lithium secondary battery in which the cathode active material includes a fluorine-doped excess-lithium rich-manganese lithium composite transition metal oxide and suppresses a voltage drop of the lithium secondary battery even in the case in which charging and discharging operations are repeated at 4.4 V or more, and a method of fabricating the same.

The present invention is further directed to a lithium secondary battery in which a voltage drop is significantly reduced even in the case in which charging and discharging operations are repeated at 4.4 V or more.

According to an aspect of the present invention, there is provided a cathode active material including a lithium composite transition metal oxide represented by $Li_{1+(c-a)/2}Ni_aCo_bMn_cO_{2-x}F_x$ ($0.1 \leq c-a \leq 0.4$, $0.13 \leq a \leq 0.3$, $0.03 \leq b \leq 0.2$, $0.4 \leq c \leq 0.6$, $(a+b+c)+(1+(c-a)/2)=2$, $0 < x \leq 0.15$, $1 \leq a/b \leq 6$, $1.9 \leq c/a \leq 4.0$, and $0.04 \leq b/(a+b+c) \leq 0.25$). The lithium composite transition metal oxide includes layer-structured $Li_2MnO_3$.

In some embodiments, a specific surface area may be 3 to 10 $m^2/g$. An average diameter of secondary particles may be 2 to 5 μm, and an average diameter of primary particles may be 50 to 500 nm.

According to another aspect of the present invention, there is provided a method of fabricating the cathode active material according to the above-described aspect of the present invention, including providing a composite transition metal hydroxide represented by an empirical formula $Ni_{a'}Co_{b'}Mn_{c'}(OH)_2$ ($0.15 \leq a' < 0.354$, $0.036 \leq b' < 0.24$, $0.48 \leq c' < 0.72$, and $a'+b'+c'=1$), mixing the composite transition metal hydroxide, a lithium source, and a fluorine source, and performing a heat treatment at 600 to 800° C.

According to still another aspect of the present invention, there is provided a lithium secondary battery including the cathode active material.

DETAILED DESCRIPTION OF EXAMPLES

Exemplary embodiments of the present invention will be described in detail below with reference to the accompanying drawings. The embodiments of the present invention may, however, be modified in different forms and should not be construed as limited to the embodiments set forth herein. Rather, these embodiments are provided so that this disclosure is thorough and complete and fully conveys the inventive concept to those skilled in the art. In the drawings, the sizes and shapes of elements may be exaggerated for clarity. Like numerals refer to like elements throughout the description of the figures.

Exemplary embodiments of the present invention relates to a cathode active material including a fluorine-doped excess-lithium rich-manganese lithium composite transition metal oxide, and more specifically, to a cathode active material for lithium secondary battery, in which a voltage drop is not occurred even in the case in which charging and discharging are repeated within the range of 2.5 to 4.7 V by limiting a molar composition ratio of cobalt to 0.2 or less and controlling the composition of lithium to have a certain relation with compositions of manganese and nickel.

An aspect of the present invention is a cathode active material including a lithium composite transition metal oxide represented by $Li_{1+(c-a)/2}Ni_aCo_bMn_cO_{2-x}F_x$ ($0.1 \leq c-a \leq 0.4$, $0.13 \leq a \leq 0.3$, $0.03 \leq b \leq 0.2$, $0.4 \leq c \leq 0.6$, $(a+b+c)+(1+(c-a)/2)=2$, $0 < x \leq 0.15$, $1 \leq a/b \leq 6$, $1.9 \leq c/a \leq 4.0$, and $0.04 \leq b/(a+b+c) \leq 0.25$), wherein the lithium composite transition metal oxide may include layer-structured $Li_2MnO_3$.

According to the exemplary embodiment of the present invention, a molar composition ratio of cobalt may be 0.03 to 0.2. Since the capacity at a high rate is small in the case in which the molar composition ratio of cobalt is less than 0.03, at least 0.03 of cobalt may be included. When the molar composition ratio of cobalt is greater than 0.2, the capacity and rate capability at a high rate may be improved. However, in the case in which charging and discharging are repeated in the range of 2.5 to 4.7 V in order to implement high capacity through $Li_2MnO_3$, it is difficult to continuously perform charging and discharging operations since cobalt is eluted and precipitated onto a separator and blocks pores of the separator. In addition, stability and reliability may be lowered since a voltage is continuously reduced during charging and discharging operations. By limiting ratios of nickel, cobalt, and manganese and ratios of transition metal and lithium as shown in the empirical formula, stable capacity and voltage at the high rate can be maintained.

A mechanism of forming the excess-lithium rich-manganese lithium composite transition metal oxide will be described. First, manganese and nickel react in a molar ratio of 1:1, and then the rest of manganese reacts with excess lithium to form $Li_2MnO_3$. Accordingly, a generation amount (content) of $Li_2MnO_3$ may be controlled by controlling the composition ratio of nickel and manganese. In addition, when excess lithium is further added as much as (c−a)/2 in consideration of charge balance with oxygen, manganese remaining without reacting with nickel reacts with the excess lithium to form $Li_2MnO_3$. That is, once the compositions of manganese and nickel are determined, the amount of excess lithium is accordingly determined, and finally the generation amount (content) of $Li_2MnO_3$ is accordingly determined.

Fluorine may be doped in the lithium composite transition metal oxide in accordance with the exemplary embodiment of the present invention. When fluorine is doped, particle surfaces of a cathode active material may be stabilized and structural transition of the cathode active material may be prevented. Further, even in the case in which the cathode active material is sintered at a low temperature, crystallinity of the cathode active material may be ensured and lifespan characteristics of the lithium secondary battery may be improved. The doping amount of fluorine may be, but not limited thereto, 0.15 or less (but more than zero) in a molar ratio. When fluorine is not doped, lifespan characteristics may not be ensured, and when the doping amount of fluorine is more than 0.15 in the molar ratio, capacity may be reduced.

Since the cathode active material in accordance with the exemplary embodiment of the present invention includes $Li_2MnO_3$, the cathode active material may have a lower electrical conductivity compared to a case in which the lithium composite transition metal oxide ($LiMO_2$) exists alone. However, according to the exemplary embodiment of the present invention, the problem may be solved by increasing a contact area (a specific surface area of the cathode active material) between cathode active material particles and an electrolytic solution, and thereby shortening travel paths of electrons and Li ions. In order to increase the contact area between the cathode active material particles and the electrolytic solution, the particle size of the cathode active material may be reduced. The cathode active material in accordance with the exemplary embodiment of the present invention may have an average diameter of 2 to 5 μm. The particle size measured by a particle size analyzer is about secondary particles in which tens of thousands of small particles are agglomerated in a spherical shape. The small particles constituting the secondary particles are referred to as primary particles. When the average diameter of the secondary particles of the cathode active material is less than 2 μm, a large specific surface area of the cathode active material may be ensured, but lifespan characteristics are undesirably degraded since side reactions between surfaces of the particles of the cathode active material and the electrolytic solution increase. In addition, the average diameter of the secondary particles may be preferably 5 μm or less, thus the travel path of lithium ions may be shortened, and therefore ion conductivity may be ensured.

According to the exemplary embodiment of the present invention, high capacity at a high rate may be implemented by controlling the shape and size of the primary particles as well as the size of the secondary particles. In other words, the particle size of the cathode active material may be reduced in order to increase the contact area between the cathode active material particles and the electrolytic solution. In order to implement high capacity even in the case in which the particle size is small, the sizes of primary particles may also need to be controlled. That is, the average diameter of the primary particles may be 50 to 500 nm, and the shape of the primary particles may be a sphere or an ellipsoid in which a ratio of a short axis to a long axis is about 1:1 to 1:2. When the primary particles have a rod shape in which the ratio of the short axis to the long axis in exceeds 1:2, it is difficult to implement high capacity.

The specific surface area of the cathode active material in accordance with the exemplary embodiment of the present invention may be 3 $m^2/g$ to 10 $m^2/g$. When the specific surface area is less than 3 $m^2/g$, rate capability may be reduced since the area in contact with electrolyte is small. In terms of capacity and rate capability, it may be preferable to increase the specific surface area. However, in the case in which the specific surface area is excessively large, lifespan characteristics may be degraded. In particular, films may be formed on surfaces of the powder of the cathode active material due to side reactions with the electrolyte, and the films may act as a resistor. Therefore, the more a cycle of charging and discharging is repeated, the more the capacity of the battery may be reduced. When the specific surface area is larger than 10 $m^2/g$, this tendency is accelerated, resulting in degradation of stability of a battery.

$Li_2MnO_3$ included in the lithium composite transition metal oxide in accordance with the exemplary embodiment of the present invention may have a layered structure. The lithium composite transition metal oxide ($LiMO_2$) (here, M is Ni, Co, and Mn) has a rhombohedral structure, and $Li_2MnO_3$ has a monoclinic structure.

Another aspect of the present invention is a method of fabricating the cathode active material described above, and more specifically to a method of fabricating a cathode active material including a fluorine-doped lithium composite transition metal oxide. The method includes preparing a composite transition metal hydroxide represented by an empirical formula $Ni_{a'}Co_{b'}Mn_{c'}(OH)_2$ (0.15≤a'<0.354, 0.036≤b'<0.24, 0.48≤c'<0.72, and a'+b'+c'=1), mixing the composite transition metal hydroxide, a lithium source, and a fluorine source, and performing a heat treatment at a temperature of 600 to 800° C.

As a precursor of the composite transition metal oxide, a hydroxide may be preferred to a carbonate. When the precursor of the composite transition metal has a form of carbonate, there is an advantage in that a specific surface area of a synthesized cathode active material is large. However, a plurality of pores may be formed in particles of the cathode active material resulting in reduction of a capacity per volume of a battery.

First, a precursor solution may be prepared by dissolving each transition metal salt in water at a constant molar ratio in consideration of precursors of a composite transition metal to be synthesized. Here, one of nickel sulfate, nickel nitride, and nickel carbonate may be used as a nickel salt, at least one of cobalt sulfate, cobalt nitride, and cobalt carbonate may be used as a cobalt salt, and at least one of manganese sulfate, manganese nitride, and manganese carbonate may be used as a manganese salt. For example, the composite transition metal precursor solution may be prepared by weighing each of sulfates of nickel, cobalt, and manganese at a constant molar ratio and putting them into water.

Next, the composite transition metal precursor may be synthesized in the form of hydroxide by putting a base, such as NaOH, $NH_4OH$, and KOH, into the composite transition metal precursor solution to cause precipitation. The pH of a reaction solution may be 10 to 12. When the pH is less than 10, particles may have a size greater than 3 μm since an agglomeration rate of the particles is greater than a nucleation rate of the particles. On the contrary, when the pH is greater than 12, it is difficult to obtain the composite transition metal hydroxide in which components of Ni, Co, and Mn are homogeneously mixed since the nucleation rate of the particles is greater than the agglomeration rate of the particles.

Next, $SO_4^{2-}$, $NH_4^+$, $NO_3^-$, $Na^+$, $K^+$, etc., which are adsorbed on surfaces of precipitated powder of the composite transition metal oxide precursor in the form of a hydroxide (composite transition metal hydroxide), are washed several times using distilled water to obtain a high-purity composite transition metal hydroxide. The high-purity composite transition metal hydroxide is dried in an oven at 150° C. for 24 hours or more such that a content of moisture is 0.1 wt % or less. The composite transition metal hydroxide obtained in such a way may be represented by an empirical formula of $Ni_{a'}Co_{b'}Mn_{c'}(OH)_2$ (0.15≤a'<0.354, 0.036≤b'<0.24, 0.48≤c'<0.72, and a'+b'+c'=1).

Next, the composite transition metal hydroxide, the lithium source, and the fluorine source are homogeneously mixed and heat-treated to fabricate the lithium Next, the composite transition metal hydroxide, the lithium source, and the fluorine source are homogeneously mixed and heat-treated to fabricate the lithium composite transition metal oxide. The heat treatment may be performed at the temperature of 600 to 800° C. When the temperature is lower than 600° C., a second phase may be generated since a solid solution is not generated between the lithium source (i.e., $Li_2CO_3$) and the composite transition metal hydroxide. When the temperature is higher than 800° C., an average particle size of the cathode active material may be greater than 5 μm due to excessive grain growth, and a specific surface area of the cathode active material may be less than 2 $m^2/g$. Accordingly, battery characteristics may be degraded.

As a lithium source, $Li_2CO_3$, LiOH, $LiNO_3$, $LiCH_3COO$, or a combination thereof may be used. As a fluorine source, LiF, $NH_4F$, NaF, KF, CsF, RbF, TiF, AgF, AgF☐, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, $WF_6$, or a combination thereof may be used.

Still another exemplary embodiment of the present invention relates to a lithium secondary battery including the cathode active material.

The cathode active material according to the exemplary embodiment of present invention may be used as a cathode material of a lithium secondary battery, may have the same structure as a well-known secondary battery except the composition and crystal structure of the cathode active material, and may be fabricated using a well-known manufacturing method. Preferably, the lithium secondary battery may be fabricated by inserting a porous separator between a porous polyethylene film as the separator, and a 1.3M $LiPF_6$ (EC/DMC/EC=5:3:2) solution as the electrolyte may be used.

Hereinafter, exemplary embodiments of the present invention will be described in detail, through Examples and Comparative Examples. However, the present invention is not limited thereto.

Example 1

A 2M aqueous metal salt solution was fabricated by adding 834 g of nickel sulfate ($NiSO_4.6H_2O$), 354 g of cobalt sulfate ($CoSO_4.7H_2O$), and 1493 g of manganese sulfate ($MnSO_4.H_2O$) to 4487 g of distilled water such that a molar ratio of Ni, Co, and Mn became Ni:Co:Mn=2.5:1.0:6.5. Then, the aqueous metal salt solution was put into a 10 L continuous reactor in a ratio of 100 ml/min. Next, a 2M aqueous ammonia ($NH_4OH$) was put into the reactor in a ratio of 10 ml/min, and then a 2M sodium hydroxide solution (NaOH) was automatically put into the reactor to maintain pH 11. A temperature of the reactor was maintained at 50° C., stirring was continuously performed at 500 rpm, and a residence time of a reaction solution in the reactor was adjusted to 10 hours. The reaction solution acquired in such a way was filtered through a filter, washed with distilled water, and dried in an oven at 120° C. for 24 hours to obtain a nickel-cobalt-manganese composite transition metal hydroxide.

100 g of the composite transition metal hydroxide, 57 g of lithium carbonate ($Li_2CO_3$), and 1.7 g of lithium fluoride (LiF) were mixed such that a molar equivalence ratio of the composite transition metal hydroxide, lithium carbonate ($Li_2CO_3$), and lithium fluoride (LiF) became 1:1.403:0.058, and sintered at 750° C. for 10 hours to obtain a fluorine-doped lithium composite transition metal oxide ($Li_{1.17}Ni_{0.21}Co_{0.08}Mn_{0.54}O_{1.95}F_{0.05}$) powder.

The lithium composite transition metal oxide (a cathode active material), Denka Black (a conductive agent), polyvinylidene fluoride (a binder) were put into an organic solvent in a weight ratio of 92:4:4 and mixed to fabricate slurry. A cathode was fabricated by uniformly coating an aluminum foil with the slurry. A coin cell was fabricated by inserting a porous separator between the cathode and an anode and inputting an electrolyte. Here, a lithium metal as the anode, a porous polyethylene film as the separator, and a 1.3M $LiPF_6$ (EC/DMC/EC=5:3:2) solution as the electrolyte were used.

Example 2

A cell was fabricated using the same method as described in Example 1, except that when a composite transition metal hydroxide was synthesized, an aqueous solution was fabricated by adding 934 g of $NiSO_4.6H_2O$, 181 g of $CoSO_4.7H_2O$, and 1573 g of $MnSO_4.H_2O$ into 4530 g of distilled water such that a molar ratio of Ni, Co, and Mn became Ni:Co:Mn=22.75:0.5:6.75 ($Li_{1.17}Ni_{0.23}Co_{0.04}Mn_{0.56}O_{1.95}F_{0.05}$).

Example 3

A cell was fabricated using the same method as described in Example 1, except that when a composite transition metal hydroxide was synthesized, an aqueous solution was fabricated by adding 333 g of $NiSO_4.6H_2O$, 356 g of $CoSO_4.7H_2O$, and 689 g of $MnSO_4.H_2O$ into 2066 g of distilled water such that a molar ratio of Ni, Co, and Mn became Ni:Co:Mn=2:2:6 ($Li_{1.17}Ni_{0.17}Co_{0.17}Mn_{0.50}O_{1.95}F_{0.05}$).

Comparative Example 1

A cell was fabricated using the same method as described in Example 1, except that when a composite transition metal hydroxide was synthesized, an aqueous solution was fabricated by adding 301 g of $NiSO_4.6H_2O$, 247 g of $CoSO_4.7H_2O$, and 254 g of $MnSO_4.H_2O$ into 1782 g of distilled water such that a molar ratio of Ni, Co, and Mn became Ni:Co:Mn=4.0:3.8:2.2 ($Li_{1.17}Ni_{0.28}Co_{0.21}Mn_{0.34}O_{1.95}F_{0.05}$).

Comparative Example 2

A cell was fabricated using the same method as described in Example 1, except that when a composite transition metal hydroxide was synthesized, an aqueous solution was fabricated by adding 883 g of $NiSO_4.6H_2O$, 32 g of $CoSO_4.7H_2O$, and 715 g of $MnSO_4.H_2O$ into 4235 g of distilled water such that a molar ratio of Ni, Co, and Mn became Ni:Co:Mn=4.5:0.2:5.3 ($Li_{1.17}Ni_{0.38}Co_{0.01}Mn_{0.44}O_{1.95}F_{0.05}$).

Comparative Example 3

A cell was fabricated using the same method as described in Example 1, except that when a composite transition metal hydroxide was synthesized, an aqueous solution was fabricated by adding 963 g of $NiSO_4.6H_2O$, 187 g of $CoSO_4.7H_2O$, and 1520 g of $MnSO_4.H_2O$ into 4530 g of distilled water such that a molar ratio of Ni, Co, and Mn became Ni:Co:Mn=2.9:0.5:6.6, and a heat treatment was performed at 1000° C. during a process of synthesizing a cathode active material ($Li_{1.17}Ni_{0.24}Co_{0.04}Mn_{0.55}O_{1.95}F_{0.05}$).

Evaluation

Physical Characteristics of Cathode Active Material

Average particle sizes $D_{50}$ and specific surface areas were measured with respect to the fluorine-doped lithium composite transition metal oxides fabricated with reference to Examples and Comparative Examples, and the results are listed in Table 1. The average particle sizes $D_{50}$ were measured using a Mastersizer 2000 (Malvern Instruments Ltd.), and the specific surface areas were measured using a BET measuring instrument (Macsorb HM Model 1208).

Evaluation of Cell Performance

The coin cells fabricated according to Examples and Comparative Examples were maintained at a constant temperature for 24 hours. Then, battery capacities and voltage drops were measured using a charge and discharge test apparatus (Toyo System Co., Ltd). The results thereof are listed in Table 1.

High rate capabilities were measured by charging and discharging in a voltage range of 2.5 to 4.7 V. Here, the high rate capability of a battery is defined as a ratio of a discharge capacity at 3C to a discharge capacity at 0.33C, that is, (the discharge capacity at 3C)/(the discharge capacity at 0.33C)× 100. The voltage drop was obtained by calculating a difference between an average voltage measured in the second cycle and an average voltage measured in the fiftieth cycle. That is, Voltage Drop=(Average Voltage in Second Cycle)–(Average Voltage in Fiftieth Cycle). The cycle test was performed by charging and discharging at a current rate of 1C in the voltage range of 2.5 to 4.6 V.

TABLE 1

| | Cathode Active Material | | | Battery Characteristics | |
|---|---|---|---|---|---|
| | Composition | $D_{50}$ (μm) | Specific Surface Area (m²/g) | High Rate Capability (3 C/0.33 C) | Voltage Drop (mV) |
| Example 1 | $Li_{1.17}Ni_{0.21}Co_{0.08}Mn_{0.54}O_{1.95}F_{0.05}$ | 3.2 | 4.2 | 83 | 33 |
| Example 2 | $Li_{1.17}Ni_{0.23}Co_{0.04}Mn_{0.56}O_{1.95}F_{0.05}$ | 3.0 | 4.5 | 85 | 38 |
| Example 3 | $Li_{1.17}Ni_{0.17}Co_{0.17}Mn_{0.50}O_{1.95}F_{0.05}$ | 3.0 | 4.5 | 84 | 36 |
| Comparative Example 1 | $Li_{1.17}Ni_{0.28}Co_{0.21}Mn_{0.34}O_{1.95}F_{0.05}$ | 3.1 | 4.1 | 82 | 98 |
| Comparative Example 2 | $Li_{1.17}Ni_{0.38}Co_{0.01}Mn_{0.44}O_{1.95}F_{0.05}$ | 3.0 | 4.2 | 60 | 34 |
| Comparative Example 3 | $Li_{1.17}Ni_{0.24}Co_{0.04}Mn_{0.55}O_{1.95}F_{0.05}$ | 7.4 | 1.59 | 75 | 105 |

Referring to Table 1, in Examples 1 to 3 and Comparative Examples 1 and 2, Comparative Example 1 is a case in which a molar composition ratio of cobalt is greater than a range (0.03 to 0.2) in accordance with the exemplary embodiments of the present invention. Examples 1 to 3 have significantly smaller voltage drops than Comparative Example 1. Further, Comparative Example 2 is a case in which a molar composition ratio of cobalt is smaller than a range (0.03 to 0.2) according to the exemplary embodiments of the present invention. Examples 1 to 3 have significantly superior high rate capabilities to Comparative Example 2. From the results, it can be found that the voltage drop of the lithium secondary battery is significantly reduced and excellent high rate capability is ensured, by controlling the molar composition ratio of cobalt in the lithium composite transition metal oxide within the range of 0.03 to 0.2.

In addition, with reference to Examples 1 to 3 and Comparative Example 3, Comparative Example 3 has a molar composition ratio of cobalt of 0.04 which belongs to the range of the exemplary embodiments of the present invention, but has a large average diameter and a small specific surface area due to a heat treatment at a high temperature. Examples 1 to 3 have significantly smaller voltage drops than Comparative Example 3. From the results, it can be found that the voltage drop of the lithium secondary battery is significantly reduced by controlling an average diameter of the cathode active material within the range of 2 to 5 μm and, at the same time, by controlling a specific surface area of the cathode active material within the range of 3 to 10 m²/g.

By using the cathode active material for a lithium secondary battery, which includes a fluorine-doped excess-lithium rich-manganese lithium composite transition metal oxide in accordance with the exemplary embodiments of the inventive concept, a voltage drop of the lithium secondary battery can be suppressed even in the case in which charging and discharging operations are repeated at 4.4 V or more.

The terminology used herein to describe embodiments of the invention is not intended to limit the scope of the invention. The use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. The present invention is not limited to the exemplary embodiments and the accompanying drawings disclosed above, and only defined by the scope of the appended claims. Accordingly, it will be apparent to those skilled in the art that various modifications, equivalents, and alternatives can be made to the above-described exemplary embodiments of the present invention without departing from the spirit or scope of the invention, and it is intended that the present invention is to cover all such modifications, equivalents, and alternatives.

What is claimed is:

1. A cathode active material, comprising a lithium composite transition metal oxide represented by $Li_{1+(c-a)/2}Ni_aCo_bMn_cO_{2-x}F_x$ ($0.1 \leq c-a \leq 0.4$, $0.13 \leq a \leq 0.3$, $0.03 \leq b \leq 0.2$, $0.4 \leq c \leq 0.6$, $(a+b+c)+(1+(c-a)/2)=2$, $0 < x \leq 0.15$, $1 \leq a/b \leq 6$, $1.9 \leq c/a \leq 4.0$, and $0.04 \leq b/(a+b+c) \leq 0.25$), wherein the lithium composite transition metal oxide includes layer-structured $Li_2MnO_3$.

2. The cathode active material of claim 1, wherein a specific surface area is 3 to 10 m²/g.

3. The cathode active material of claim 1, wherein an average diameter of secondary particles is 2 to 5 μm, and an average diameter of primary particles is 50 to 500 nm.

4. The cathode active material of claim 1, wherein the cathode active material is a mixture of a rhombohedral material and a monoclinic material.

5. A method of fabricating the cathode active material described in claim 1, comprising:
providing a composite transition metal hydroxide represented by an empirical formula of $Ni_{a'}Co_{b'}Mn_{c'}(OH)_2$ ($0.15 \leq a' < 0.354$, $0.036 \leq b' < 0.24$, $0.48 \leq c' < 0.72$, and $a'+b'+c'=1$); and
mixing the composite transition metal hydroxide, a lithium source, and a fluorine source and performing a heat treatment at 600 to 800° C.

6. The method of claim 5, wherein the lithium source is one or more selected from the group consisting of $Li_2CO_3$, $LiOH$, $LiNO_3$, $LiCH_3COO$, and a mixture thereof.

7. The method of claim 5, wherein the fluorine source is one or more selected from the group consisting of LiF, $NH_4F$, NaF, KF, CsF, RbF, TiF, AgF, AgF☐, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, $WF_6$, and a mixture thereof.

8. A lithium second battery comprising the cathode active material described in any one of claim 1.

\* \* \* \* \*